July 8, 1941.   H. NUTT   2,248,377
CLUTCH CONTROL
Filed May 8, 1933   5 Sheets-Sheet 1
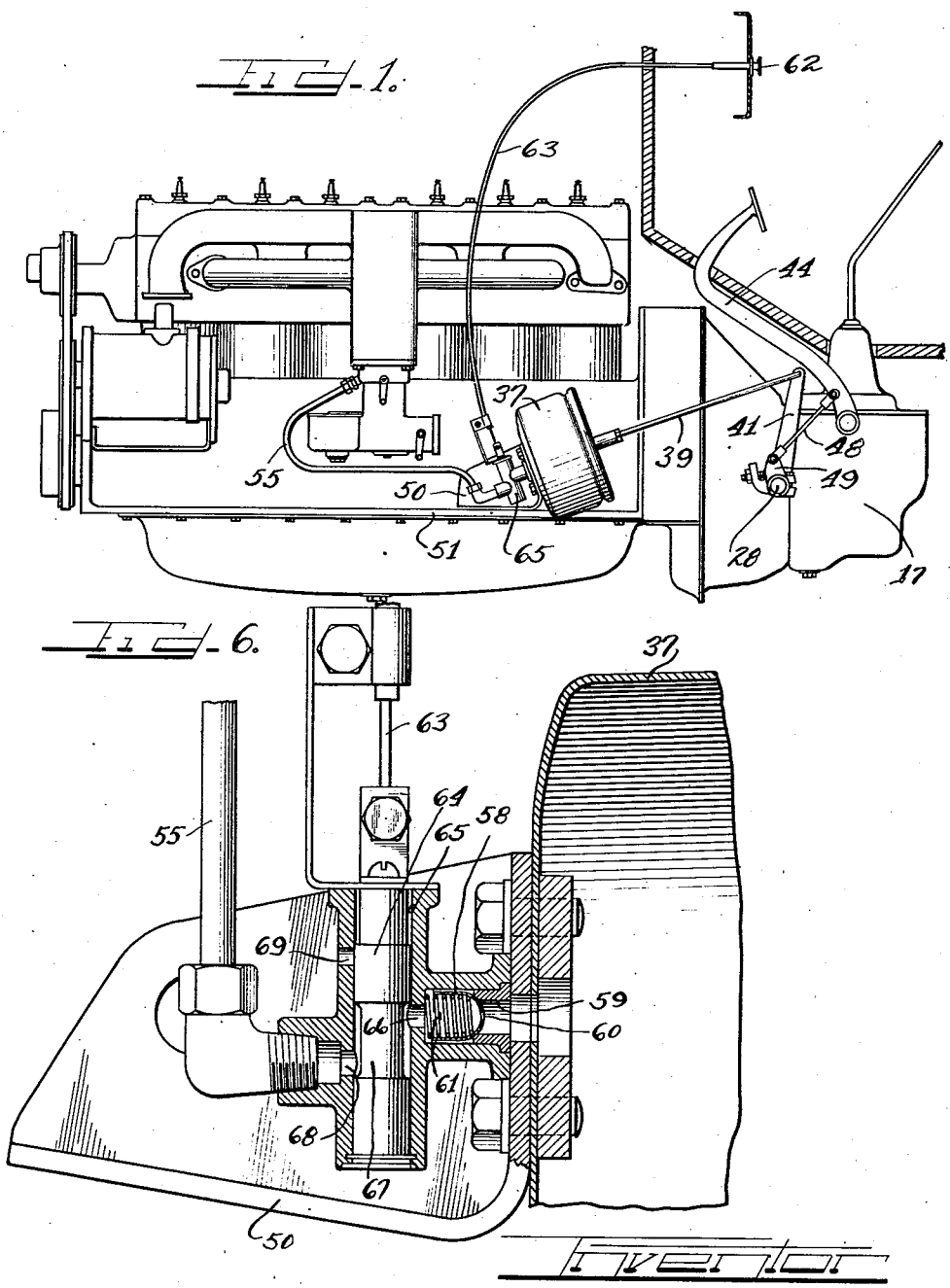
Inventor
Harold Nutt.
by Charles Orahill Attys.

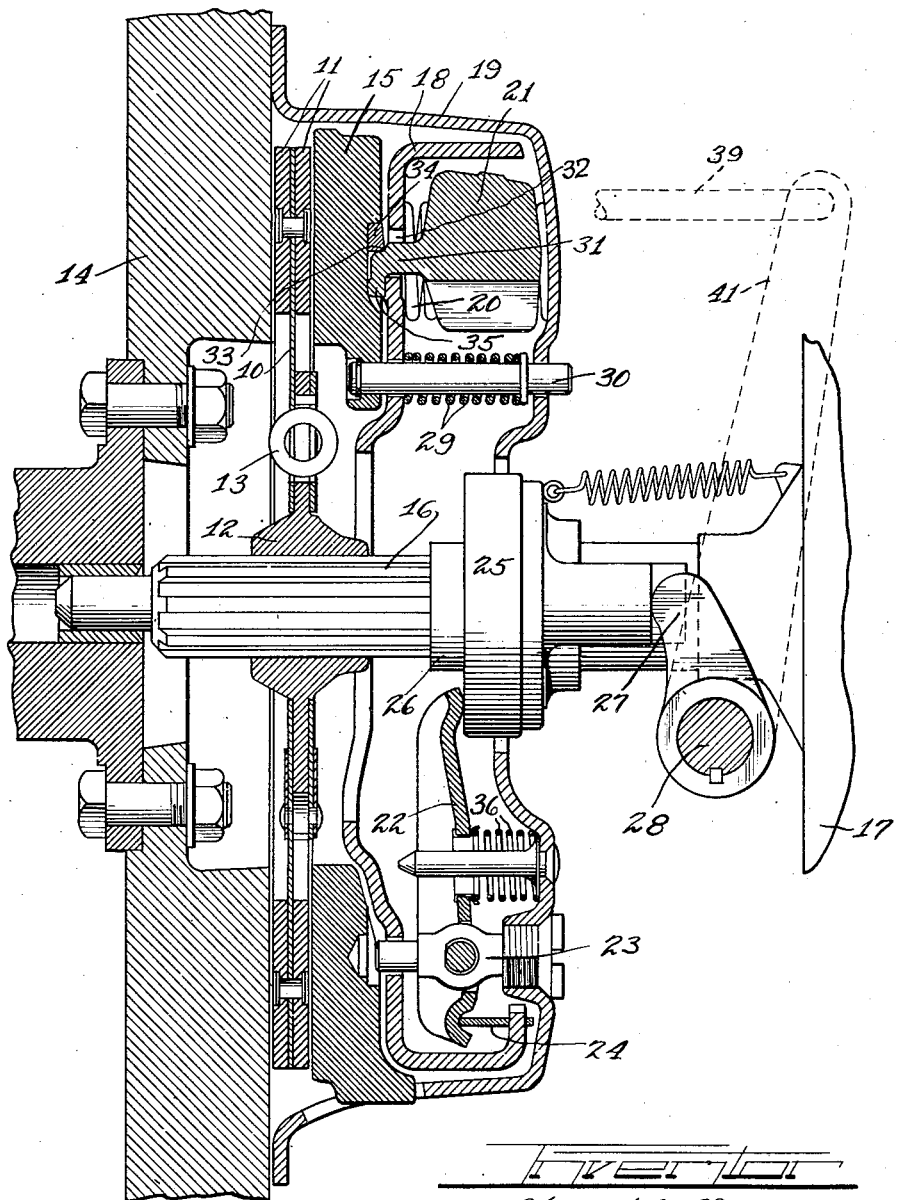

July 8, 1941.  H. NUTT  2,248,377
CLUTCH CONTROL
Filed May 8, 1933  5 Sheets-Sheet 3
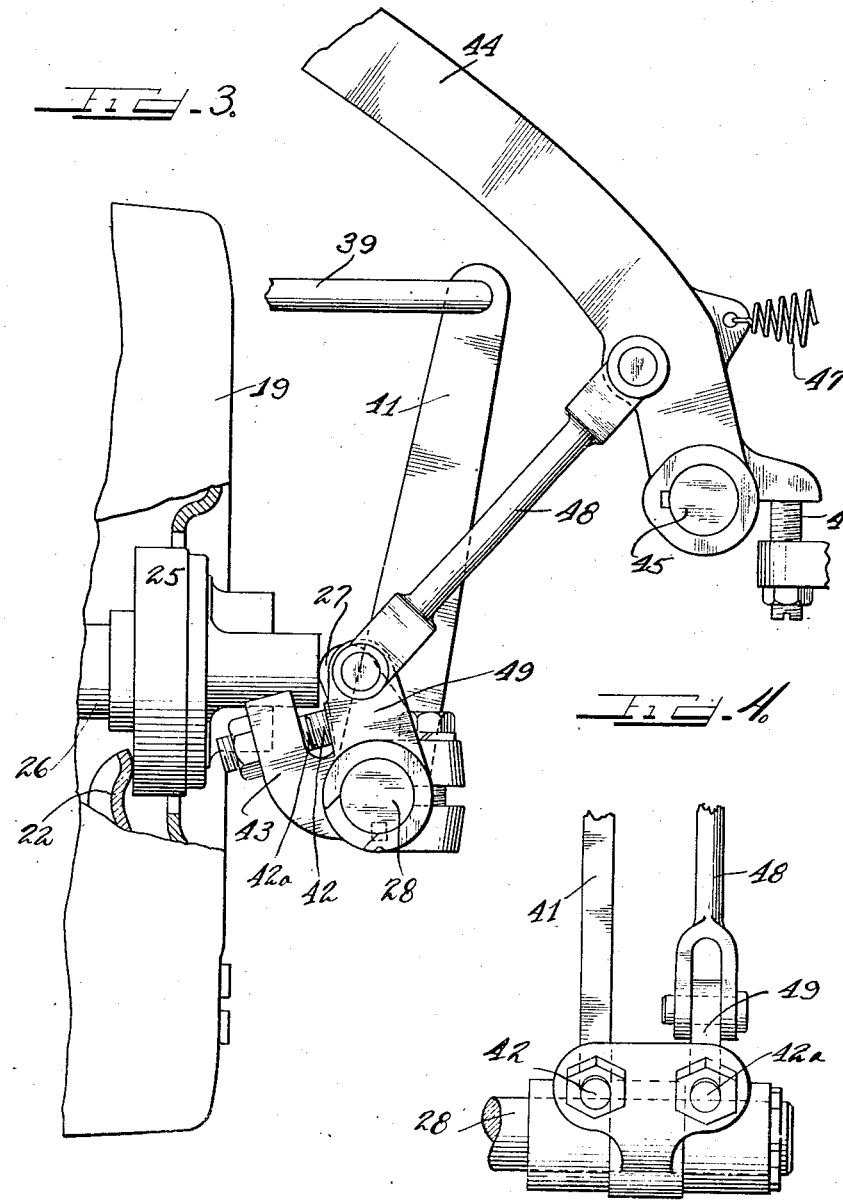
Inventor
Harold Nutt.
by Charles H. Hills Attys July 8, 1941.  H. NUTT  2,248,377
CLUTCH CONTROL
Filed May 8, 1933   5 Sheets-Sheet 4
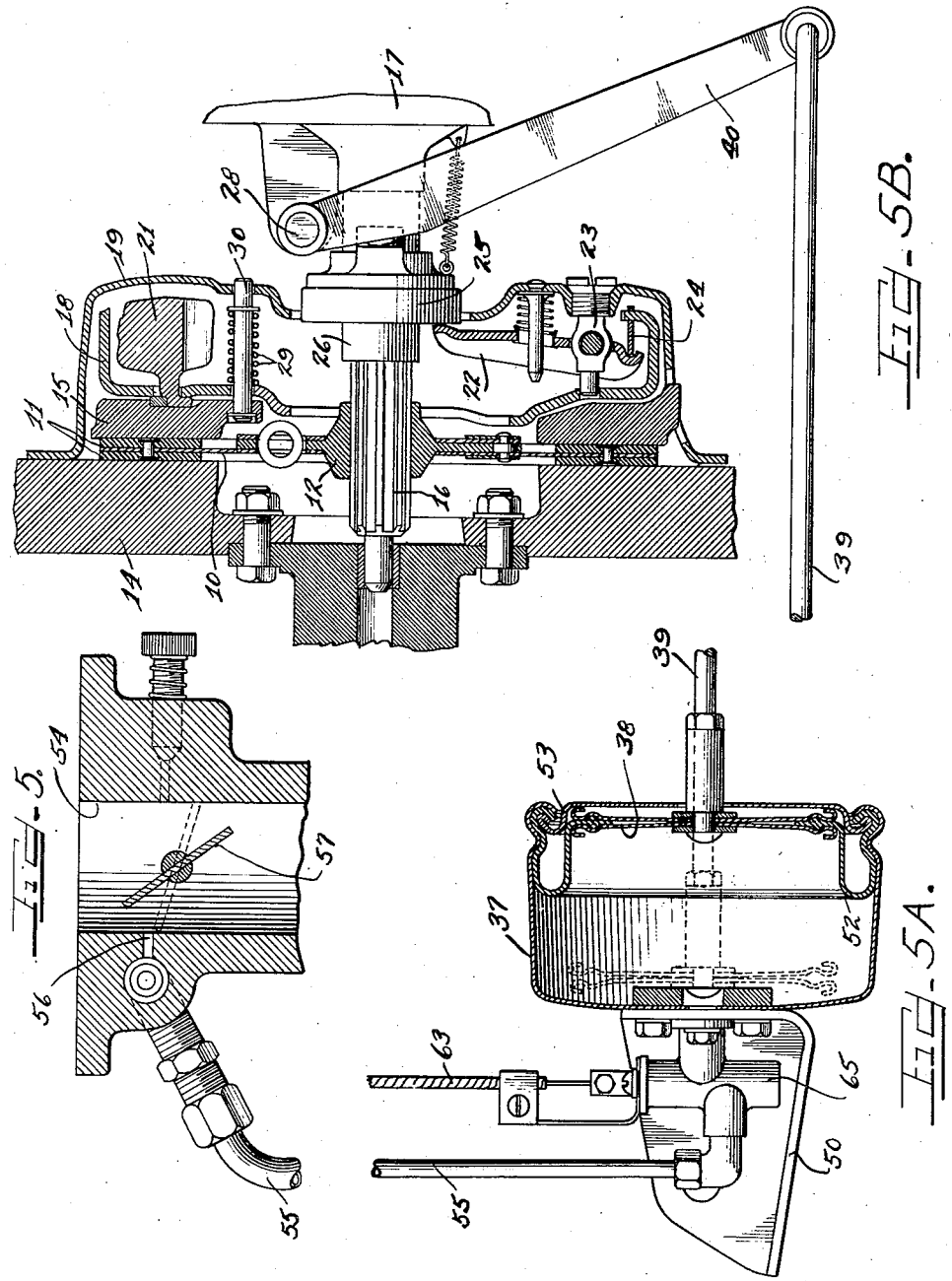
Inventor
Harold Nutt.
by Charles T. Mills
Attys.

July 8, 1941.  H. NUTT  2,248,377
CLUTCH CONTROL
Filed May 8, 1933  5 Sheets-Sheet 5
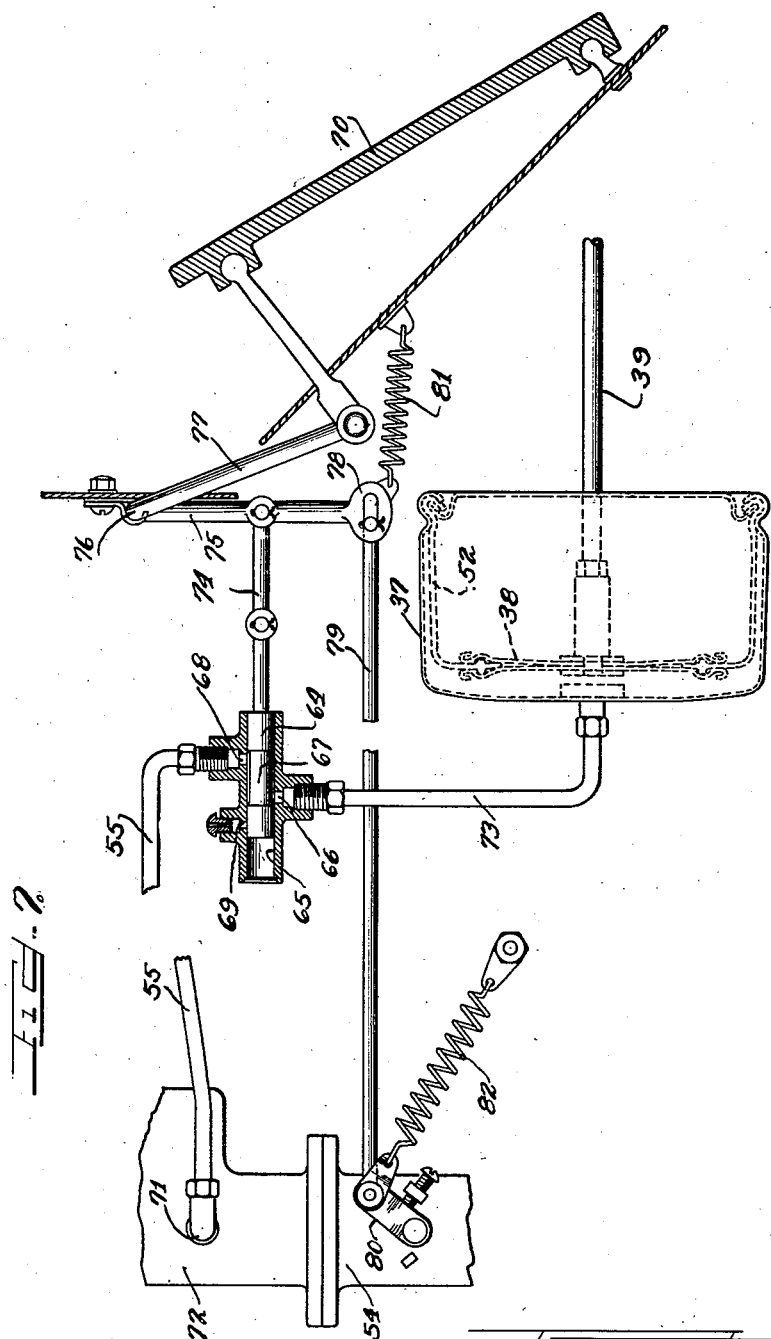
Inventor
Harold Nutt.
by Charles O. Hills Attys.

Patented July 8, 1941

2,248,377

UNITED STATES PATENT OFFICE 2,248,377

CLUTCH CONTROL

Harold Nutt, Chicago, Ill., assignor, by mesne assignments, to Borg-Warner Corporation, Chicago, Ill., a corporation of Illinois Application May 8, 1933, Serial No. 669,964

29 Claims. (Cl. 192—105)

This invention relates to an automobile clutch control wherein a speed responsive automatic clutch is subjected to both vacuum and manual controls facilitating engagement and disengagement of the clutch in opposition or supplemental to the automatic speed responsive control. For the purposes of this invention, the particular type of automatic clutch is not of primary importance since the invention is directed to the supplementary control thereof intended to compensate for operating limitations common to such types of clutches which only engage at or above a predetermined rotative speed.

It is an object of this invention to provide a clutch control of the class described that will improve and supplement the normal operating characteristics of an automatic speed responsive clutch. If sufficient centrifugal capacity is provided in such a clutch to insure against an unreasonable amount of slippage at slow engine speeds in high gear, then clutch engagement in low gear and reverse is altogether too rapid or harsh, resulting in jerky starts. If centrifugal capacity is reduced enough to make the action in low gear more satisfactory, then there will be entirely too much slip in high gear at moderate driving speeds between 15 and 25 miles per hour. This is objectionable not only to the occupants of a vehicle, but because of too rapid facing wear. I overcome this defect by utilizing inadequate centrifugal capacity for high gear conditions and providing a vacuum control which holds the clutch normally disengaged under idling conditions and provides for auxiliary clutch engagement supplementing the centrifugal control as the engine throttle is opened up at low engine speeds thus providing the required capacity under such condition. Normal starts in low gear and reverse are then made smoothly by the reduced capacity centrifugal engagement, but the rate of centrifugal engagement at the higher engine speeds in low and reverse is still sufficiently rapid to make engagement practically complete before the relatively slow vacuum controlled engagement can take place.

It is another object of this invention to provide a supplemental control for automatic speed responsive clutches adapted to cause clutch engagement independent of the speed control except under idling conditions, under which circumstances the engine suction is sufficient to shift the supplemental control into a non-interfering position relative to the speed responsive control. With this arrangement if the engine should be stopped for any reason the supplemental control would cause clutch engagement, thus permitting starting the engine by pushing the vehicle, or providing for the use of the engine and transmission, when left in gear, as a parking brake.

It is a further object of this invention to provide improved automatic and manual controls supplementing and capable of dominating an automatic speed responsive clutch whereby to control the action of the clutch in accordance with operating conditions requiring a modification or cancellation of the effect of a simple speed responsive control.

It is another object of this invention to provide an improved and simplified automatic clutch control of the class described that operates in accordance with a normal operator's driving technique and which can be locked out at will to operate as a normal clutch engaged at all times until manually disengaged by the operator.

Other and further important objects of this invention will be apparent from the disclosures in the specification and the accompanying drawings.

This invention (in a preferred form) is illustrated in the drawings and hereinafter more fully described.

On the drawings:

Figure 1 is a side elevation of an internal combustion engine and transmission unit having a clutch control embodying the features of this invention.

Figure 2 is a central longitudinal section through an automatic clutch embodying the control of this invention, the clutch being shown in its disengaged position.

Figure 3 is a fragmentary elevational view of the control mechanism acting against the clutch throwout bearing.

Figure 4 is a fragmentary showing, looking from the left towards Fig. 3, showing the interacting manual and automatic controls.

Figure 5 is a fragmentary sectional view of the manifold connection, the full line positions of the throttle corresponding to clutch engagement under vacuum control, and the dotted line position corresponding to clutch engagement under idling conditions.

Figure 5a is a sectional view of the vacuum controlled clutch operator.

Figure 5b is a sectional view of the engine clutch mechanism employing a modified leverage connection.

Figure 6 is a fragmentary sectional detail of the lockout control and check valve associated with the vacuum cylinder.

Figure 7 embodies a modified form of vacuum operation under the control of the accelerator pedal.

As shown on the drawings:

The clutch control of this invention has been shown on the drawings in connection with an automatic centrifugally operated clutch the particular form of which is not essential to the present invention, which in its broader sense is intended to control automatically operating clutches normally disengaged at engine idling speeds and engaged by accelerating the engine to a speed above the idling speed.

The particular clutch illustrated comprises a conventional driven disc 10 carrying friction facings 11 and mounted on a hub 12 through a torque cushioning drive including springs 13. The disc is disposed between the rear face of the engine flywheel 14 and an axially movable pressure plate 15, which plate is advanced towards the flywheel to take up running clearances and clamp the driven disc against the flywheel to transmit power therefrom to a driven shaft 16 which forms the driving shaft of a transmission 17.

The pressure plate 15 is backed by a spring mounting ring 18 within a housing 19 bolted to the flywheel, pressure springs 20 being preloaded, between the spring ring and the housing, to a total pressure determined by the desired torque rating of the clutch. These springs are equivalent to the pressure springs of a normal clutch, and determine the maximum engaging pressure transferred to the pressure plate when a series of centrifugal weights 21 swing outwardly as will hereinafter be described. The spring ring is normally held in the position shown in Fig. 2 by throwout fingers 22 fulcrumed to an anchor 23 adjustably secured to the housing, the outer ends of the throwout fingers having a link 24 connecting to the spring mounting ring, while the inner ends of the fingers normally contact and follow a throwout bearing 25 slidable on a sleeve 26 enveloping the driven shaft. The throwout bearing is backed by a throwout fork 27 on a shaft 28, and when the bearing is held in the position of Fig. 2, it acts through the multiplying leverage of the throwout fingers 22 to hold the spring mounting ring retracted in the position shown, against the resistance of the load of the pressure springs. The pressure plate, when the centrifugal weights are in their unenergized position shown in Fig. 2, is caused to follow the spring mounting ring by retractor springs 29 on shouldered guide studs 30 carried by the pressure plate, thus holding the clutch in its released position. Upon backing off the throwout bearing, i. e., moving it to the right as shown in Fig. 5, the clutch can be engaged while the centrifugal weights are inactive, thus permitting clutch engagement with a dead engine, as when it is desired to start the engine by pushing the car. By moving the throwout bearing 25 to the left from the central position shown in Fig. 2, the automatically engaged clutch can be manually disengaged in the same way as a normal non-automatic clutch.

The automatic or centrifugal engagement of the clutch is accomplished by the outward swing of the weights 21, which carry offset lugs 31 interposed between the pressure plate and the spring mounting ring, passing through slots 32 in the latter. The lugs 31 resemble boots, the heels 33 thereof form fulcrums for the weights, bearing against hardened inserts 34 on the pressure plate; while the toes 35 thereof engage beneath the spring mounting ring. An outward movement of the weights 21 due to centrifugal force acts between the heels 33 and toes 35 to pry the pressure plate and spring mounting ring apart, the pressure plate moving to the left until running clearances are taken up, and then the spring mounting ring moves slightly towards the right, transferring the pressure spring load to the pressure plate and at the same time withdrawing the throwout fingers from contact with the throwout bearing when the latter is in the position of Fig. 2. Light springs 36 serve to take up looseness in the finger linkage. This is the normal driving position wherein the clutch automatically engages and disengages in response to variations in engine speeds above and below a predetermined critical speed slightly above idling.

The clutch control of this invention serves to modify the engagement characteristics of the automatic clutch, and comprises a vacuum cylinder 37 and piston 38 linked by a piston rod 39 to a throwout lever on the shaft 28. In that form of the invention shown in Figs. 5, 5a and 5b a throwout lever 40 may act directly against the throwout bearing 25, or be keyed as a unit to the shaft 28. In Figs. 1, 2, 3, and 4 however, a lever 41 is loose on the shaft 28 and acts against an adjustable stop 42 carried by a lug 43 secured to the shaft. In either case, when vacuum pulls the piston 38 to the left the throwout bearing is moved in the same direction into the position of Fig. 2 and upon release or failure of the vacuum the piston is pulled to the right by the pressure of the clutch pressure springs acting through the throwout fingers and throwout bearing, to permit a full engagement of the clutch without the help of the centrifugal weights, as shown in Fig. 5b.

Figs. 3 and 4 show a clutch pedal control normally unaffecting the vacuum and centrifugal control of the clutch, but manually operable in the usual way to disengage a centrifugally engaged clutch. This pedal control comprises a usual type of foot pedal 44 pivoted at 45 and normally yieldingly held against a stop 46 by a spring 47. The pedal has a link connection 48 to a lever 49 loose on the throwout shaft 28 and acting against a duplicate stop 42a on the lug 43, the arrangement being such that the vacuum piston linkage can shift the throwout bearing 25 to the left up to the position of Fig. 2, while the pedal control can shift the throwout bearing still further to the left to manually disengage the automatically engaged clutch. Also the throwout bearing can shift to the right to the position of Fig. 5 upon release of the vacuum without affecting the position of the pedal. When the clutch is in the automatically released position of Figs. 2 and 3, the clutch pedal may be depressed, without resistance other than its spring 47, by an amount proportionately equal to the stroke of the vacuum piston. If the engine has stopped, or if for any reason the vacuum in the cylinder is reduced, the piston will be pulled out to the end of the cylinder by the clutch springs, reducing the free movement or pedal back lash to the amount usually provided in a conventional clutch. When the clutch must be manually released, with the engine running at speeds above the critical point where the centrifugal weights swing out to cause automatic clutch engagement, the pedal must be further depressed against the resistance of the clutch springs acting through the throwout fingers and throwout bearing, to overcome the pressure plate travel caused by the centrifugal weights. It will be noted however that the manual effort required to disconnect the clutch under such circumstances is measured by the pressure spring loading and is therefore no more than the effort required to disconnect a conventional clutch of equivalent rating. Also, when the vacuum cylinder is ineffective or locked out, the clutch becomes a conventional one entirely under manual control since then the pressure springs push the throwout bearing to the right into the engaged position shown in Fig. 5b, disengagement then being dependent upon a partial or complete depression of the clutch pedal, up to the point of its normal freedom when the weights are not energized, and a full stroke when the weights have swung out.

While the vacuum cylinder 37 and piston 38 have been so referred to for convenience the cylinder may conveniently be formed as a sheet metal shell attached to a bracket 50 mounted wherever the layout dictates, as for example on the joint 51 between the crankcase and oil sump of the engine, as shown in Fig. 1. The piston 38 may conveniently be provided with a flexible diaphragm 52, the periphery of which may be crimped to the cylinder shell with the aid of a partial end closure 53. This specific construction is not essential, but has the advantages of simplicity, reliability, and freedom from binding due to the angular movements of the piston rod 39.

The cylinder 37 is connected to the intake manifold passage 54 by tubing 55 leading to a port 56 adjacent the edge of the usual throttle valve 57 controlling the operation of the engine. The port is so disposed relative to the throttle valve that it is subjected to a high manifold suction under idling conditions when the valve is approximately closed, but that a slight opening movement of the valve will carry its edge past the port and so expose the port to the much more nearly atmospheric pressure below the valve. With this arrangement high idling suction serves to pull the diaphragm piston to the left causing a release of the clutch while an opening movement of the throttle beyond that required for a car speed of approximately 20 miles per hour on the level will practically kill the vacuum in the cylinder and thus permit a movement of the piston to the right under the urging of the clutch springs thus engaging the clutch under low speed at partial and full throttle conditions when the centrifugal weights may not have sufficient power to cause full engagement.

An important feature of this invention is to provide a reasonably delayed or prolonged period during which the centrifugal action of the clutch picks up its load before vacuum engagement takes place and to this end it is desirable to retard the movement of the piston towards the right. This delayed rate of vacuum engagement when making a start from a standstill does not interfere with centrifugal action which insures immediate complete engagement at the higher engine speeds existing at car speeds at which gear changes are made. In order to provide the desired delay the vacuum cylinder is arranged with a dashpot effect limiting the rate of movement to the right by providing a check valve 58 spring urged against a seat 59 and having a limited air bleed port 60 therein, as illustrated in Figure 6. This port can be proportioned so as to restrict the refilling of the cylinder to any desired time interval depending on engine and transmission characteristics. In normal practice the desirable time element may vary from 2 to 6 seconds depending on the installation. Consequently no condition of operation can be encountered where the duration of clutch slip at partial or full throttle openings will exceed the time for complete vacuum engagement. Moreover the maximum speed of slip cannot exceed the speed at which full engine torque is developed centrifugally. Thus definite control of facing wear is obtained. For the reverse or vacuum operation, which moves the piston to the left, no delay is necessary so that the check valve is arranged to move away from its seat when subjected to suction, the air flow from the cylinder then passing around the valve and through notches 61 in its rim.

In addition to the foregoing control it is advisable to provide means to permit disconnection or lock-out of the vacuum control when it is desired to operate the clutch as a normal non-automatic one. To this end a dash button 62 is provided which operates a Bowden wire control 63 connected to a piston 64 reciprocable in a cylinder 65 into which a port 66 opens from the check valve chamber. The piston 64 is provided with a central section 67 of reduced diameter which ordinarily places the port 66 in communication with a vacuum port 68 to which the tubing 55 leads. When the dash button is pulled out the piston is pulled up until the vacuum port 68 is cut off and a vent port 69 is then in communication with the check valve port 66, permitting refilling of the vacuum cylinder with atmospheric air, which allows the clutch to engage gradually at a rate determined by the use of hole 60, and eliminates further vacuum control of the clutch. This arrangement has an important advantage, since while the clutch is converted into a normal clutch entirely under the operator's control, he is unable to abuse the clutch and transmission by snapping the clutch into sudden engagement.

The modified control shown in Fig. 7 utilizes a mechanical connection to the accelerator pedal 70 controlling the movement of the throttle 57 to operate a vacuum control comprising the previously described lock-out for releasing the vacuum on the cylinder 37. With this arrangement the vacuum line 55 can be connected anywhere above the throttle 57 as at 71 in the intake manifold 72, and leads to the port 68 in the valve body 65. Under idling conditions the valve piston 64 places the port 68 in communication with the cylinder port 66, which is connected by a tube 73 to the vacuum cylinder, and thus shifts the vacuum piston 38 to the left to disengage the clutch under such circumstances. The valve piston 64 has a link 74 to one arm 75 of a U-shaped member, the central portion 76 of which forming a pivot for the arm 75 and a second arm 77 connected to the accelerator pedal. With this arrangement depressing the accelerator pedal acts through the arms 77 to 75 to shift the valve piston 64 to the left, first cutting off the port 68 and then uncovering the vent port 69, which latter may conveniently be provided with a passaged set screw 80 to adjustably restrict the air flow. The arm 75 is extended below the valve link 74 and is provided with a lost motion connection 78 to a rod 79 operating the throttle lever 80 and a spring 81 is provided to take up the lost motion connection so that the initial movement of the accelerator shifts the valve piston nearly to the cut off point before the throttle is moved from its idling position. A second spring 82 serves to return the throttle to its idling position.

With this arrangement the valve piston 64 is shifted in a position to cut off the vacuum from the cylinder upon an opening movement of the throttle so that a slight throttle opening will be enough to open the vent 69 and allow the vacuum piston 38 to start its movement to the right to supplement the centrifugal engagement of the clutch. Thus this modification operates in substantially the same way as the principal form previously described.

The foregoing vacuum clutch control cooperates with the centrifugal control to pick up the torque load smoothly and to give full clutch engagement at partial and full throttle and at speeds too low to fully energize the automatic clutch. It also permits the use of a less powerful automatic or centrifugal control which would otherwise be inadequate in action to function without slippage at low speeds. Full throttle operation at low engine speeds will not result in excessive clutch slippage with its attendant rapid clutch facing wear if the vacuum line is connected adjacent the throttle valve, where small throttle openings, below that corresponding to the level road driving speed of approximately 20 miles per hour, will retain the vacuum system under the control of manifold suction, while larger throttle openings will leave the automatic clutch unaffected by the vacuum control because of the transfer of the suction port 56 to the carbureter side of the throttle valve. It is thus possible to arrange the location of the suction port 56 so that clutch engagement will take place at any desired amount of throttle opening independent of the degree of vacuum in the manifold on the engine side of the throttle valve.

It will thus be seen that I have invented an improved clutch control for automatic or speed responsive clutches, wherein clutch engagement is controlled by intake vacuum at small throttle openings, yet the clutch is in full engagement under low speed partial and full throttle operating conditions where the automatic clutch would otherwise fail to carry the full torque.

I am aware that many changes may be made and numerous details of construction may be varied through a wide range without departing from the principles of this invention, and I, therefore, do not purpose limiting the patent granted hereon otherwise than necessitated by the prior art.

I claim as my invention:

1. In combination with the suction intake manifold and throttle valve of an internal combustion engine, a suction connection to said manifold adjacent the edge of the throttle valve when in its closed position, said suction connection being exposed to manifold suction when the throttle valve is closed, and to the lesser degree of suction anterior to the throttle valve when the latter is partially opened, a spring operated and centrifugally controlled clutch, and suction operated means energized by said suction of said manifold and supplementing the centrifugal clutch control to disconnect said clutch at high degrees of suction and to permit engagement of said clutch at speeds insufficient to fully energize the centrifugal control as the throttle valve opens to expose said suction connection to the lesser degree of suction anterior to said throttle valve.

2. In combination with the suction intake manifold and throttle valve of an internal combustion engine, a suction connection to said manifold adjacent the edge of the throttle valve when in its closed position, said suction connection being exposed to manifold suction when the throttle valve is closed, and to the lesser degree of suction anterior to the throttle valve when the latter is partially opened, a speed responsive clutch disengaged at speeds below a predetermined speed range, and suction operated means energized by said suction and supplementing the control of said speed responsive clutch whereby to engage said clutch below the predetermined speed range upon a partial opening of the throttle valve exposing the suction connection to the suction conditions anterior to the throttle valve.

3. In combination, an internal combustion engine including a suction operated fuel mixture supply means and a throttle control valve therefor, a suction connection terminating adjacent the throttle valve when the same is in closed position whereby the suction imposed on the connection will decrease upon an opening movement of the throttle, clutch operating means actuated by said suction, and a spring operated and speed responsive clutch permitted to be engaged by said operating means at minimum engine suctions regardless of the speed of the engine, the position of the terminal of said suction connection permitting actuation of said operating means to allow a decreasing clutch slippage whenever the throttle valve is opened slightly from its closed position.

4. In combination, an internal combustion engine including a suction operated fuel mixture supply means and a throttle control valve therefor, a suction connection terminating adjacent the throttle valve to impose full engine suction thereon only when the throttle is in closed position, clutch operating means actuated by said suction and a centrifugally controlled clutch structure, said clutch operating means being operable to modify the control of the centrifugal means of said clutch upon a decrease in the degree of suction transmitted through said suction connection upon an opening movement of the throttle valve.

5. In combination with a clutch automatically engageable above a predetermined rotative speed, a suction clutch operator adapted to permit said clutch to engage regardless of the rotative speed and operative to disengage said clutch at high degrees of suction when the rotative speed is below the predetermined speed, means for delaying the movement of said suction clutch operator from its clutch disengaging position to its inactive position whereby to provide a predetermined delay in clutch engagement sufficient to properly pick up the load under extreme operating conditions, and means for locking out said suction clutch operator in its inactive position whereby to convert the automatically engageable clutch into a normally engaged clutch under the operator's control.

6. In combination with a clutch automatically engageable above a predetermined rotative speed, a suction clutch operator adapted to permit said clutch to engage regardless of the rotative speed and operative to disengage said clutch at high degrees of suction when the rotative speed is below the predetermined speed, and means for locking out said suction clutch operator in its inactive position.

7. In combination with a clutch automatically engageable above a predetermined rotative speed, a suction clutch operator adapted to permit said clutch to engage regardless of the rotative speed and operative to disengage said clutch at high degrees of suction when the rotative speed is below the predetermined speed, means for delaying the movement of said suction clutch operator from its clutch disengaging position to its inactive position whereby to provide a predetermined delay in clutch engagement sufficient to properly pick up the load under extreme operating conditions, means for locking out said suction clutch operator in its inactive position, and manually operable means cooperating with said clutch operator adapted to disengage said clutch regardless of the operation of either the automatic or suction clutch engaging mechanism.

8. In combination with a clutch automatically engageable above a predetermined rotative speed, a suction clutch operator adapted to permit said clutch to engage regardless of the rotative speed and operative to disengage said clutch at high degrees of suction when the rotative speed is below the predetermined speed, and means for locking out said suction clutch operator in its inactive position, and manually operable means cooperating with said clutch operator adapted to disengage said clutch regardless of the operation of either the automatic or suction clutch engaging mechanism.

9. In combination with a speed responsive clutch for internal combustion engines having a power control, said clutch being automatically engaged above a predetermined speed and disengaged below such speed, means responsive to movement of the power control of the engine adapted to engage said clutch independently of the automatic speed responsive engagement of the clutch upon increase in the power requirements on the engine, said means also being adapted to cause clutch engagement upon stoppage of the engine, and means for delaying the engagement of said clutch by said means whereby to provide a predetermined time interval during which said clutch engagement occurs.

10. In combination with a speed responsive clutch for internal combustion engines having a power control, said clutch being automatically engaged above a predetermined speed and disengaged below such speed, means responsive to movement of the power control of the engine adapted to engage said clutch independently of the automatic speed responsive engagement of the clutch upon increase in the power requirements on the engine, said means also being adapted to cause clutch engagement upon stoppage of the engine, means for delaying the engagement of said clutch by said means whereby to provide a predetermined time interval during which said clutch engagement occurs, and means for locking said means in its clutch engaging position.

11. In combination with a speed responsive clutch for internal combustion engines having a power control, said clutch being automatically engaged above a predetermined speed and disengaged below such speed, means responsive to movement of the power control of the engine adapted to engage said clutch independently of the automatic speed responsive engagement of the clutch upon increase in the power requirements on the engine, said means also being adapted to cause clutch engagement upon stoppage of the engine, and means for locking said means in its clutch engaging position.

12. In combination with a speed responsive clutch for internal combustion engines having a power control, said clutch being automatically engaged above a predetermined speed and disengaged below such speed, means responsive to movement of the power control of the engine adapted to engage said clutch independently of the automatic speed responsive engagement of the clutch upon increase in the power requirements on the engine, said means also being adapted to cause clutch engagement upon stoppage of the engine, and manually operable means cooperating with said clutch operator adapted to disengage said clutch regardless of the operation of either the automatic or clutch engaging or power control mechanism.

13. In combination with a speed responsive clutch for internal combustion engines having a power control, said clutch being automatically engaged above a predetermined speed and disengaged below such speed, means responsive to movement of the power control of the engine adapted to engage said clutch independently of the automatic speed responsive engagement of the clutch upon increase in the power requirements on the engine, said means also being adapted to cause clutch engagement upon stoppage of the engine, means for delaying the engagement of said clutch by said means whereby to provide a predetermined time interval during which said clutch engagement occurs, means for locking said means in its clutch engaging position, and manually operable means cooperating with said clutch operator adapted to disengage said clutch regardless of the operation of either the automatic or clutch engaging or power control mechanism.

14. In combination with a speed responsive clutch for internal combustion engines having a power control, said clutch being automatically engaged above a predetermined speed and disengaged below such speed, means responsive to movement of the power control of the engine adapted to engage said clutch independently of the automatic speed responsive engagement of the clutch upon increase in the power requirements on the engine, said means also being adapted to cause clutch engagement upon stoppage of the engine, means for locking said means in its clutch engaging position, and manually operable means cooperating with said clutch operator adapted to disengage said clutch regardless of the operation of either the automatic or clutch engaging or power control mechanism.

15. In combination with a speed responsive clutch for internal combustion engines having a power control, said clutch being automatically engaged above a predetermined speed and disengaged below such speed, means responsive to movement of the power control of the engine adapted to engage said clutch independently of the automatic speed responsive engagement of the clutch upon increase in the power requirements on the engine, said means also being adapted to cause clutch engagement upon stoppage of the engine, means for delaying the engagement of said clutch by said means whereby to provide a predetermined time interval during which said clutch engagement occurs, and manually operable means cooperating with said clutch operator adapted to disengage said clutch regardless of the operation of either the automatic or clutch engaging or power control mechanism.

16. The combination with an internal combustion engine having an intake manifold and an accelerator, of a clutch mechanism, including driving and driven members, friction discs and a pressure plate contributing to form an operative connection between said members, clutch springs for effecting displacement of said pressure plate to complete clutch engagement, centrifugally controlled members operable by said driving member and acting to effect displacement of said pressure plate to complete clutch engagement, holdback springs for holding said centrifugally controlled members in retracted position at low speeds of said driving member but yieldable to permit said last named member to effect clutch engagement at high speeds of the driving member, clutch release means, a vacuum clutch control operatively connected to said clutch release means, means for establishing communication between the interior of the intake manifold and of the vacuum clutch control, and means operatively connected to said accelerator for controlling the operation of said vacuum clutch control by the vacuum within the intake manifold.

17. The combination with an internal combustion engine having an intake manifold and an accelerator, of a clutch mechanism including driving and driven members, friction discs and a pressure plate contributing to form an operative connection between said members, clutch springs for effecting displacement of said pressure plate to complete clutch engagement, centrifugally controlled members operable by said driving member and acting to effect displacement of said pressure plate to complete clutch engagement, holdback springs for holding said centrifugally controlled members in retracted position at low speeds of said driving member but yieldable to permit said last named members to effect clutch engagement at high speeds of the driving member, clutch release means, a vacuum clutch control operatively connected to said clutch release means, means for establishing communication between the interior of the intake manifold and the vacuum clutch control, and means operatively connected to said accelerator for operation thereby to control the degree of vacuum created within the vacuum clutch control by the vacuum within the intake manifold.

18. The combination with an internal combustion engine having an intake manifold and an accelerator, of a clutch mechanism including driving and driven members, friction discs and a pressure plate contributing to form an operative connection between said members, clutch springs for effecting displacement of said pressure plate to complete clutch engagement, centrifugally controlled members operable by said driving member and acting to effect displacement of said pressure plate to complete clutch engagement, holdback springs for holding said centrifugally controlled members in retracted position at low speeds of said driving member but yieldable to permit said last named members to effect clutch engagement at high speeds of the driving member, clutch release means, a vacuum clutch control operatively connected to said clutch release means, means for establishing communication between the interior of the intake manifold and the vacuum clutch control, and means operatively connected to said accelerator for controlling communication between the interior of the intake manifold and the interior of the vacuum clutch control.

19. The combination with an internal combustion engine having an intake manifold and an accelerator, of a clutch mechanism including driving and driven members, friction discs and a pressure plate contributing to form an operative connection between said members, clutch springs for effecting displacement of said pressure plate to complete clutch engagement, centrifugally controlled members operable by said driving member and acting to effect displacement of said pressure plate to complete clutch engagement, holdback springs for holding said centrifugally controlled members in retracted position at low speeds of said driving member but yieldable to permit said last named members to effect clutch engagement at high speeds of the driving member, clutch release means, a vacuum clutch control operatively connected to said clutch release means, means for establishing communication between the interior of the intake manifold and the vacuum clutch control, and a valve operatively connected to said accelerator for controlling the vacuum condition within the vacuum clutch control.

20. The combination with an internal combustion engine having an intake manifold and an accelerator, of a clutch mechanism including driving and driven members, clutch springs for effecting displacement of said pressure plate to complete clutch engagement, centrifugally controlled members operable by said driving member and acting to effect displacement of said pressure plate to complete clutch engagement, holdback springs for holding said centrifugally controlled members in retracted position at low speeds of said driving member but yieldable to permit said last named members to effect clutch engagement at high speeds of the driving member, clutch release means, a vacuum clutch control operatively connected to said clutch release means, means for establishing communication between the interior of the intake manifold and the vacuum clutch control, and valve means interposed in said last named means for selectively establishing communication between the interior of the vacuum clutch control and the interior of the intake manifold or between the interior of the vacuum clutch control and the atmosphere.

21. The combination with an internal combustion engine having an intake manifold and an accelerator, of a clutch mechanism including driving and driven members, friction discs and a pressure plate contributing to form an operative connection between said members, clutch springs for effecting displacement of said pressure plate toward said driving member to complete clutch engagement, centrifugally controlled members operative by said driving member and acting to effect displacement of said pressure plate toward said driving member to complete clutch engagement, holdback springs for holding said centrifugally controlled members in retracted position at low speeds of the driving member but yieldable to permit said last named members to effect clutch engagement at high speeds of the driving member, clutch release means, means operatively connected to the accelerator for controlling the vacuum clutch control by the vacuum within the intake manifold.

and a vacuum clutch control operatively connected to said clutch release means and in communication with the intake manifold for effecting lateral displacement of the centrifugally controlled members selectively to effect clutch engagement by the clutch springs or by the centrifugally controlled members in response to the speed of the driving member and the vacuum condition in the intake manifold.

22. The combination with an internal combustion engine having an intake manifold, a carburetor communicating with the intake manifold, a throttle valve in said carburetor, and an accelerator operatively connected to said throttle valve, of a clutch mechanism including driving and driven members, friction discs and a pressure plate contributing to form an operative connection between said members, clutch springs for effecting lateral displacement of said pressure plate toward said driving member to complete clutch engagement, centrifugally controlled members operable in response to the speed of said driving member to effect the lateral displacement of said pressure plate toward said driving member to complete clutch engagement, holdback springs for retracting said centrifugally controlled members when the speed of the driving member drops below a predetermined point, clutch release means, and a vacuum clutch control operatively connected to said clutch release means and communicating with the vacuum connection between the carburetor and the intake manifold adjacent the throttle valve to control the operation of the vacuum clutch control in response to varying vacuum conditions in the intake manifold.

23. The combination with an internal combustion engine having an intake manifold, a carburetor communicating with the intake manifold, a throttle valve in said carburetor, and an accelerator operatively connected to said throttle valve, of a clutch mechanism including driving and driven members, friction discs and a pressure plate contributing to form an operative connection between said members, clutch springs for effecting lateral displacement of said pressure plate toward said driving member to complete clutch engagement, centrifugally controlled members operable in response to the speed of said driving member to effect the lateral displacement of said pressure plate toward said driving member to complete clutch engagement, holdback springs for retracting said centrifugally controlled members when the speed of the driving member drops below a predetermined point, clutch release means, and a vacuum clutch control operatively connected to said clutch release means and communicating with the vacuum connection between the carburetor and the intake manifold adjacent the throttle valve to control the operation of the vacuum clutch control in response to the position of the throttle valve and the degree of vacuum in the intake manifold.

24. The combination with an internal combustion engine having an intake manifold and an accelerator, of a clutch mechanism including driving and driven members, friction discs and a pressure plate contributing to form an operative connection between said members, clutch springs for effecting lateral displacement of said pressure plate toward said driving member to complete clutch engagement, centrifugally controlled members mounted for lateral displacement relative to said driving member and operable thereby to effect corresponding lateral displacement of said pressure plate to complete clutch engagement, holdback springs for retracting said centrifugally controlled members to inoperative position in response to low speed operation of the driving member, clutch release means, and a vacuum clutch control operatively connected to said clutch release means and communicating with said intake manifold for laterally displacing said centrifugally controlled members to release clutch engagement effected by the clutch springs and to permit the centrifugally controlled members to effect clutch engagement in response to rotation of the driving member above a predetermined rate, the vacuum clutch control being under the control of the accelerator.

25. The combination with an internal combustion engine having an accelerator and an intake manifold, of a clutch mechanism including means for automatically causing clutch engagements upon operation of the engine above idling speed, releasable means for permitting clutch engagements irrespective of the operation of said automatic means, a vacuum clutch control communicating with said intake manifold for operation thereby and operably connected to said releasable means for operating the latter, valve means operable by said accelerator for controlling the vacuum conditions imposed on the vacuum clutch control by the vacuum within the intake manifold, and a connection between said valve means and said vacuum clutch control having a metered orifice for restricting the operation of said automatic means.

26. For controlling an automatic clutch having a throw-out shaft adapted to assume an engaged position wherein the clutch is engaged at all speeds; a disengaged position, where the clutch is disengaged at all speeds; and an intermediate automatic position, where the clutch operation is responsive to speed; a lever member rockably mounted on said throw-out shaft; an arm member rigidly connected to said throw-out shaft; power means connected to said lever member; lost-motion means for connecting said arm and lever members comprising a screw connected to one of said members and adapted to be engaged by the other of said members, whereby said power means may rock said shaft from clutch engaged position to automatic position, and yet said shaft may move from automatic position to disengaged position without producing movement of said lever member, and means for rocking said throw-out shaft to disengaged position and for causing said screw to move away from said other member, said last named means comprising a lever having a lost-motion connection between it and said arm member.

27. The combination with an internal combustion engine having an intake manifold and an accelerator, of a clutch mechanism including driving and driven members, friction discs and a pressure plate contributing to form an operative connection between said members, clutch spring means for effecting displacement of said pressure plate to complete clutch engagement, centrifugally controlled members operable by said driving member and acting to effect displacement of said pressure plate to complete clutch engagement, clutch release means, a vacuum clutch control operatively connected to said clutch release means, means for establishing communication between the interior of the intake manifold and of the vacuum clutch control, and means operatively connected to said accelerator for controlling the operation of said vacuum clutch control by the vacuum within the intake manifold.

28. The combination with an internal combustion engine having an intake manifold and an accelerator, of a clutch mechanism including driving and driven members, friction discs and a pressure plate contributing to form an operative connection between said members, centrifugally controlled members operable by said driving member and acting to effect displacement of said pressure plate to complete clutch engagement, clutch release means, a vacuum clutch control operatively connected to said clutch release means, means for establishing communication between the interior of the intake manifold and of the vacuum clutch control, and means operatively connected to said accelerator for controlling the operation of said vacuum clutch control by the vacuum within the intake manifold.

29. The combination with an internal combustion engine having an accelerator and an intake manifold, of a clutch mechanism including means for automatically causing clutch engagement upon operation of the engine above idling speed, releasable means for permitting clutch engagement irrespective of the operation of said automatic means, a vacuum clutch control communicating with said intake manifold for operation thereby and operably connected to said releasable means for operating the latter, valve means operable by said accelerator for controlling the vacuum conditions opposed on the vacuum clutch control by the vacuum within the intake manifold.

HAROLD NUTT.